United States Patent Office 3,468,759
Patented Sept. 23, 1969

3,468,759
6-AZAURACIL RIBOSIDE
Jan Skoda, Vilem Hess, and Frantisek Sorm, Prague, Czechoslovakia, assignors to SPOFA, spojene farmaceuticke zavody, narodni podnik, Prague, Czechoslovakia
No Drawing. Continuation of application Ser. No. 456,589, Apr. 1, 1965, which is a continuation-in-part of application 712,660, Feb. 3, 1958. This application May 9, 1966, Ser. No. 548,794
Claims priority, application Czechoslovakia, Feb. 28, 1957, 773/57
Int. Cl. C12b 1/00; A61k 27/00
U.S. Cl. 195—28                                        3 Claims This application is a continuation of application Ser. No. 456,589 filed April 1, 1965, now abandoned, which is a continuation-in-part of application Ser. No. 712,660 filed February 3, 1958, and now abandoned, for Method of Preparing Ribosides and Desoxy Ribosides of Nucleic Acid Bases and Their Derivatives.

The present invention relates to 6-azauracil riboside, and more particularly to a method of producing the same and to the use of the same as a bacteriostatic agent, as a cancerostatic agent, i.e. to inhibit the growth of tumors, and as an anti-cancerous and an anti-leukemic agent.

It is an object of the present invention to provide a method for biochemical synthesis of 6-azauracil riboside.

It is another object of the present invention to provide the use of 6-azauracil riboside as a cancerostatic agent, i.e. in causing the reduction of tumors, and as an anti-cancerous and anti-leukemic agent.

Other objects and advantages of the present invention will be apparent from a further reading of the specification and of the appended claims.

With the above and other objects in view, the present invention mainly comprises the production of 6-azauracil riboside and the use thereof in the treatment of cancers. The compound is a valuable cancerostatic agent and it has also showed excellent anti-leukemic activity.

In accordance with the method of the present invention the 6-azauracil is exposed to a fermenting culture of an appropriate microorganism capable of being cultivated in a synthetic cultivation medium or broth, particularly *Escherichia coli*, and the product is, after removal of the microorganism, isolated by adsorption on charcoal or on another adsorptive material. Other appropriate microorganisms are e.g. Aerobacter, Salmonella, Streptococcus, Micrococcus, Sacharomyces, Torulopsis, Penicillium, Rhizopus, Aspergillus, Actinomyces.

The process may be easily carried out in the usual equipment used in the fermentation industry, i.e. in fermentation tanks provided with means for agitating and aerating. The process is extremely simple and may be analytically controlled without difficulties.

Synthetic cultivation media are well known in the art. They are composed of inorganic nutrient sats, sugars such as glucose, and growth factors in aqueous solutions. A typical synthetic broth is stated in Example 1.

The yields, computed on the 6-azauracil base are practically quantitative.

The following examples are given to further illustrate the present invention. The scope of the invention is not, however, meant to be limited to the specific details of the examples.

Example 1

300 liters of a cultivating medium are prepared as follows: 1060 grams of glucose are dissolved in 5 liters of water, and the sterilized solution is added under aseptic conditions to the main part of an aqueous solution containing:

|  | Grams |
|---|---|
| Ammonium sulfate | 792 |
| Sodium chloride | 174 |
| Magensium sulfate (crystalline) | 72 |
| Calcium chloride (crystalline) | 3 |
| Ferrous sulfate (crystalline) | 4.5 |
| Dihydrogen potassium orthophosphate | 816 |
| Disodium hydrogen orthophosphate | 8595 |

This medium is inoculated with 1% of inoculum, consisting of a 24 hours old culture of *Escherichia coli* in the same cultivating medium.

After a cultivation of 6 hours a sterile solution of 6-azauracil is added in such an amount as to obtain a molar concentration of $7.10^{-4}$. Then the fermentation is continued for an additional 5–15 hours at 37° C.

The medium is then cooled with water and the product is adsorbed on charcoal in a column and eluated with an aqueous 50% ethanol containing 1% of ammonia. The eluate is evaporated and the pure product is obtained by recrystallization from butanol saturated with water or chromatographically by means of a cellulose column. The yield is more than 90%, based on the 6-azauracil. The pure substance melts at 160–161° C.

Ribosides and deoxyribosides of other bases of this type may be prepared in the same way.

Example 2

An inoculum culture of *Aerobacter areogenes* is prepared in usual manner using a meat-peptone-agar medium and a cultivating broth of the following composition:

| | |
|---|---|
| Meat infusion _____cc__ | 500 |
| Distilled water _____cc__ | 480 |
| Basic cornsteep solution _____cc__ | 20 |
| Peptone _____grams__ | 10 |
| Sodium chloride _____do____ | 5 |
| d-Glucose _____do____ | 10 |

The pH value of the sterilized broth is 7.2–7.4.

The inoculum thus obtained is used for inoculating the content of a seed tank. The cultivation of the inoculum in the seed tank is effected with the use of the same synthetic broth as is used for the biological transformation of 6-azauracil to 6-azauracil riboside in the fermenter stage:

| | Percent |
|---|---|
| Ammonium sulfate | 0.26 |
| Sodium chloride | 0.06 |
| Magnesium sulfate | 0.025 |
| $KH_2PO_4$ | 0.27 |
| $Na_2HPO_4$ | 2.87 |
| d-Glucose | 1.0 |

The cultivation proceeds at 35–37° C. with an aeration of 0.5 volume per minute in a stainless steel seed tank equipped with a mixer operating at 300 revolutions per minute. The state of growth of the aerobacter in the seed tank is controlled turbidimetrically. When the optimum value is reached, i.e. after 3–8 hours according to the strain used, 1% of the inoculum from the seed tank is used for the biological transformation of the 6-azauracil which is carried out under the same conditions.

After 4–8 hours of cultivation 6-azauracil is added in a total amount of 0.02% in four equal doses in 10–15 minute intervals. The fermentation is continued 4–10 hours after the last addition of 6-azauracil. When the turbidimetrically controlled growth shows signs of declining the chromatographic analysis is started and is carried out every hour. The biological process is stopped after the complete disappearance of 6-azauracil or when its amount does not show any further diminution.

The product is recovered in the following manner:

The broth is chilled and acidified, whereafter the bacterial mass is separated either by filtration or by centrifugation.

Then the crude product is adsorbed on a battery of columns of granulated active charcoal. After full saturation of the charcoal the columns are eluated with aqueous methanol (50%) containing 2% of ammonia. The eluate is concentrated by evaporation to approximately one tenth of its volume.

The concentrate is chilled and the precipitated salts are separated. The remaining solution is diluted and passed through a column of a weakly basic ion-exchanger in the OH-form, the ion-exchanger being used up to the very limit of its capacity in order to avoid losses of 6-azauracil riboside which is not adsorbed under said condition.

The slightly alkaline filtrate is decolorized by means of active charcoal and then passed through a column of a strongly basic ion-exchanger in the OH-form. After saturation the ion-exchanger is selectively eluated with dilute acetic acid. The eluate is evaporated to dryness and deprived of last traces of water by azeotropic distillation with a benzene-ethanol mixture.

The crude 6-azauracil riboside thus obtained is recrystallized from aqueous ethanol. The yield is about 90% computed on the 6-azauracil.

The same process may be carried out with *Escherichia coli*. Provided that the cultivating conditions are properly adapted in the manner well known to those skilled in the art, any other microorganisms from the classes Aerobacter, Salmonella, Streptococcus, Micrococcus, Sacharomyces, Torulopsis, Penicillium, Rhizopus, Aspergillus and Actinomyces, capable of being cultivated in synthetic broths of the kind mentioned above, may be used.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of producing 6-azauracil riboside which comprises subjecting 6-azauracil to a fermenting culture of a microorganism selected from the group consisting of *Escherichia coli* and *Aerobacter aerogenes* until 6-azauracil riboside is formed in the culture medium; and recovering 6-azauracil riboside from said medium.

2. A method as defined in claim 1, wherein said microorganism is *Escherichia coli*.

3. A method as defined in claim 1, wherein said microorganism is *Aerobacter aerogenes*.

References Cited

Biochimica et Biophysica Acta, vol. 28, pages 659 and 660 (1958).

ALVIN E. TANENHOLTZ, Primary Examiner

U.S. Cl. X.R.

260—211.5; 424—180